March 5, 1940.   D. S. REID   2,192,481
LOOM SHUTTLE
Filed Sept. 27, 1939
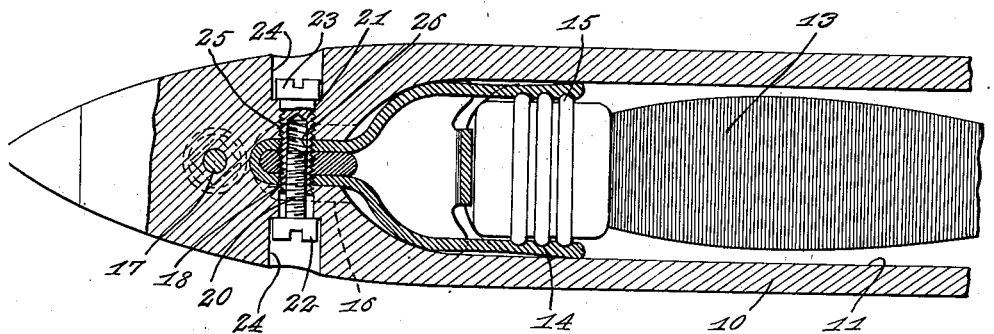
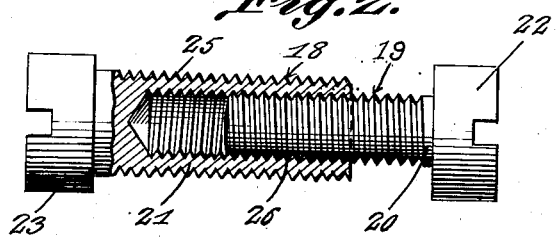
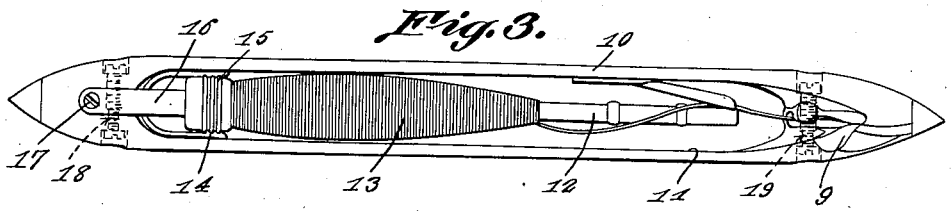
Daniel S. Reid, INVENTOR
BY Victor J. Evans & Co.
ATTORNEYS Patented Mar. 5, 1940

2,192,481

UNITED STATES PATENT OFFICE 2,192,481

LOOM SHUTTLE

Daniel S. Reid, Birmingham, Ala., assignor of one-half to Fernand L. Charles, Birmingham, Ala.

Application September 27, 1939, Serial No. 296,853

4 Claims. (Cl. 139—207)

This invention relates to loom shuttles and has for an object to promote the long life of a shuttle and prevent injury to the reed by the provision of telescopically assembled screws in lieu of the conventional screws used in shuttles.

In practice one side of the shuttle slides against the reed when the loom is running, and as the shuttle wears the screws are tightened from time to time. Eventually they protrude through the shuttle and ruin the reed.

With the above in mind the present invention provides screws comprising telescopically related parts which are screw threadedly engaged with each other, each screw comprising two heads mounted in countersinks formed in the shuttle and through the medium of which both or one part of each screw may be turned to effect the tightening of the screw, the more the screw is tightened the further it recedes from the reed and positively cannot ruin the reed so that the long life of the shuttle and the reed is greatly promoted.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of one end of a shuttle equipped with a screw formed of a telescopically related member in accordance with the invention.

Figure 2 is a side elevation of one of the screws with a portion broken away.

Figure 3 is a plan view of a shuttle equipped with screws in accordance with the invention.

Referring now to the drawing in which like characters of reference designate similar parts in the various views, 10 designates a shuttle having a central longitudinal opening 11 to receive a bobbin 12 having filling 13 wound thereon. Resilient spring holding jaws 14 are grooved in the usual way on their inner faces to receive the angular rings 15 of the bobbin. A bobbin directing plate 16 is combined with the holding jaws and is pivotally secured in place at one end by a pin 17. At the opposite end of the shuttle the eye 9 is disposed. These parts are conventional.

In carrying out the invention screws 18 and 19 are substituted for the usual screws which secure the spring jaws and the eye in place. As best shown in Figure 2 each screw comprises telescopically related parts 20 and 21 having respective heads 22 and 23 mounted in countersinks 24 in the shuttle as shown in Figure 1. These heads permit both or one part of each screw to be turned to effect the tightening of the screw. The outer part of the screw 18 assembled with the spring jaws is provided with screw threads 25 to permit the adjustment of the jaws so as to arrange the end of the bobbin in any desired position in the shuttle. The telescopically assembled parts of each screw are screw threadedly engaged with each other as shown at 26.

In use as the shuttle wears one or both of the telescopically related parts of each screw may be turned to tighten the screw and the more the screw is tightened the farther the heads 22 and 23 recede inward from the outer surface of the shuttle and thus the side of the shuttle may slip against the reed when the loom is running without damage to the reed.

From the above description it is thought that the construction and operation of the invention will be fully understood without further explanation.

What is claimed is:

1. The combination with a loom shuttle having an eye and a bobbin directing plate, of screws securing the eye and bobbin directing plate in place, each comprising telescopically related parts screw threadedly engaged with each other, each part having a head mounted in a countersink formed in the shuttle and through the medium of which both or one part of the screw may be turned to effect the tightening of the screw, the outer part of that screw associated with the bobbin directing plate being screw threadedly engaged with the plate whereby to permit adjustment of the plate.

2. In a loom shuttle having an eye and a bobbin holder at the end remote from the eye, the improvement which comprises reversely threaded axially aligned screws entering the shuttle from opposite sides, one of said screws being threadingly engaged with the bobbin holder and the other threadingly engaged with the first.

3. In a loom shuttle having an eye and a bobbin holder at the end remote from the eye, the improvement which comprises axially aligned screws entering the shuttle from opposite sides, one of said screws being threadingly engaged with the bobbin holder and the other threadingly engaged with the first.

4. In a loom shuttle having an eye and a bobbin holder at the end remote from the eye, the improvement which comprises telescoping reversely threaded screws entering the shuttle from opposite sides, one of said screws being threadingly engaged with the bobbin holder and the other maintaining the adjustment of the first.

DANIEL S. REID.